US007945101B2

(12) United States Patent
Chen et al.

(10) Patent No.: US 7,945,101 B2
(45) Date of Patent: May 17, 2011

(54) INNOVATIVE OCR SYSTEMS AND METHODS THAT COMBINE A TEMPLATE BASED GENERATIVE MODEL WITH A DISCRIMINATIVE MODEL

(75) Inventors: Jindong Chen, Belmont, CA (US); Yizhou Wang, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 963 days.

(21) Appl. No.: 11/828,425

(22) Filed: Jul. 26, 2007

(65) Prior Publication Data
US 2009/0028443 A1 Jan. 29, 2009

(51) Int. Cl.
*G06K 9/72* (2006.01)
*G06K 9/66* (2006.01)
*G06K 9/62* (2006.01)
*G06K 9/70* (2006.01)

(52) U.S. Cl. ........ 382/229; 382/190; 382/195; 382/224; 382/228

(58) Field of Classification Search .......... 382/185–189, 382/190, 192, 224, 227–229
See application file for complete search history.

(56) References Cited

U.S. PATENT DOCUMENTS

| 5,321,773 | A | 6/1994 | Kopec | |
|---|---|---|---|---|
| 7,245,767 | B2* | 7/2007 | Moreno et al. | 382/224 |
| 2005/0190187 | A1* | 9/2005 | Salesin et al. | 345/471 |
| 2006/0036399 | A1* | 2/2006 | Yang et al. | 702/181 |
| 2006/0050962 | A1* | 3/2006 | Geiger et al. | 382/186 |
| 2007/0081706 | A1* | 4/2007 | Zhou et al. | 382/128 |

OTHER PUBLICATIONS

Sarkar, "Document Image Analysis for Digital Libraries", IWRIDL 2006.*
G. Chandalia and M. Beal (2006), Using Fisher Kernels from TopicModels for Dimensionality Reduction, *NIPS 2006 Workshop: Novel Applications of Dimensionality Reduction*.
C-C Chang and C-J Lin, LIBSVM: a library for support vector machines, 2001. Software available at http://www.csie.ntu.edu.tw/_cjlin/libsvm.
J. Edwards and D. Forsyth (2005) Searching for Character Models, *Neural Info. Proc. Systems (NIPS)*.
A.D. Holub, M. Welling and P. Perona (2005) Combining generative models and Fisher kernels for object recognition, *Int'l Conf. On Computer Vision (ICCV)*, 1, 664-671.
T.S. Jaakkola and D. Haussler (1998) Exploiting generative models in discriminative classifiers, *NIPS*.
G.E. Kopec (1997) Multilevel character templates for document image decoding, *Document Recognition IV, SPIE* 3027.
G.E. Kopec and A. Chou (1994) Document image decoding using Markov source models, *IEEE Tran. on Pattern Analysis and Machine Intelligence (PAMI)* 16.6, 602-617.
H. Ma and D. Doermann (2005) Adaptive OCR with limited user feedback, *Int'l Conf. on Document Analysis and Recognition (ICDAR)*, 814-818.

(Continued)

*Primary Examiner* — Vu Le
*Assistant Examiner* — Soo Jin Park
(74) *Attorney, Agent, or Firm* — Fay Sharpe LLP

(57) ABSTRACT

A method employing a hybrid classification model is used to perform optical character recognition operations for an image. Image data from the image is provided to a generative classification model of the hybrid model, and generative image classifications operations are performed, generating a feature data set which is outputted from the generative classification model. This feature data set is then provided to the discriminative classification model, and discriminative classification operations are performed to generate a classification of the image.

15 Claims, 12 Drawing Sheets

OTHER PUBLICATIONS

A.Y. Ng and M. Jordan (2001) On discriminative vs. generative classifiers: A comparison of logistic regression and naive Bayes, *NIPS*.

Raina, Y. Shen, A.Y. Ng and A. McCallum (2003) Classification with hybrid generative/discriminative models, *NIPS*.

P. Sarkar and H. S. Baird (2004) Decoder banks: versatility, automation, and high accuracy without supervised training. *Int'l Conf. on Pattern Recognition (ICPR)*, 2, 646-649.

P. Sarkar, H. S. Baird and X. Zhang (2003) Training on severely degraded text-line images. *ICDAR*, 38-43.

K. Tsuda, M. Kawanabe and K-R Muller (2002) Clustering with the Fisher score, *NIPS*.

S. Tong and D. Koller (2000) Restricted Bayes Optimal Classifiers, *National Conference on Artificial Intelligence (AAAI)*.

M. Weber, M. Welling and P. Perona (2000) Towards automatic discovery of object categories, *Computer Vision and Pattern Recognition (CVPR)*, 2101.

T.P. Minka et al., "Document Image Decoding Using Iterated Complete Path Search", *Document Recognition and Retrieval VIII, SPIE* -4307, pp. 250-258, 2001.

* cited by examiner

```
GOOSS* TEMPUS* LORRAINE* 2157875573
DANG* HANNA* 29444136122756545400
35799 1991 004421 0922 8224 007174098
```

FIG. 1

| 229145 | 305787 | 011428 | 411044 |
| 513540 | 859970 | 292405 | |

FIG. 5

| $\Theta(1,1)$ | ... | $\Theta(1,w_C)$ |
|---|---|---|
| ... | ... | ... |
| $\Theta(h_C,1)$ | ... | $\Theta(h_C,w_C)$ |

*FIG. 6*

| METHOD | ERROR | DIM | COMPLEXITY |
|---|---|---|---|
| GenDis (1-vs-all) | 1.4% | 135 | 369K |
| Pixel SVM (1-vs-all) | 1.6% | 352 | 693K |
| GenDis (1-vs-1) | 3.2% | 141 | 330K |
| Pixel SVM (1-vs-1) | 3.7% | 352 | 785K |
| SVM on Likelihood | 9.2% | N/A | N/A |
| Likelihood | 11.1% | N/A | N/A |
| ABBYY OCR 7.0 | 42.5% | N/A | N/A |

FIG. 8

| METHOD | ERROR | DIM | COMPLEXITY |
|---|---|---|---|
| GenDis | 8.75% | 165 | 161K |
| Pixel SVM | 20.07% | 352 | 230K |

FIG. 9A

| Truth | 'A' | 'D' | 'G' | 'I' | 'O' | 'S' | 'T' |
|---|---|---|---|---|---|---|---|
| Predicted | '4' | '0' | '8' | '1' | '0' | '8' | '1' |
| GenDis | 0 | 20 | 17 | 2 | 65 | 35 | 10 |
| Pixel SVM | 87 | 30 | 19 | 59 | 33 | 58 | 83 |

FIG. 9B

INNOVATIVE OCR SYSTEMS AND METHODS THAT COMBINE A TEMPLATE BASED GENERATIVE MODEL WITH A DISCRIMINATIVE MODEL

BACKGROUND

The present application is directed to data classification, and more particularly to use of data classification in data recognition systems, including, but not limited to, optical character recognition (OCR) systems.

Two approaches to data classification which have been extensively studied in the machine learning literature are generative models and discriminative models. Generative models learn a joint probability density function, p(x; y), between data (x) and their labels y, or equivalently the likelihood p(x/y) and prior p(y) states. In the latter case, Bayes' rule can be applied to obtain the posterior distribution p(y/x), which is maximized to predict the class labels of new data. On the other hand, discriminative models either estimate the posterior p(y/x) directly, or they compute decision boundaries between different classes.

It is considered that in many applications that, compared to generative models, discriminative models are easier to train and can achieve higher classification accuracy. However, generative models have their own advantages which include: (1) establishing an intrinsic linkage to hidden variables or missing data in an Expectation Maximization (EM) learning and inference framework; (2) being flexible and robust enough to handle complicated scenarios, such as detecting visual objects in cluttered backgrounds with occlusion; (3) often having superior performance to discriminative models when training data sets are small; (4) being suited to incremental learning, for example, whenever a new class emerges, or an existing class model needs updating, training can be conducted only on the relevant portion of the data. By contrast, discriminative models have to be re-trained with all of the data to adapt to the changes.

The above suggests that it is advantageous to combine the two complementary models into a hybrid framework which is not only flexible in learning, but also has high performance in terms of prediction accuracy and computational efficiency. There are several examples of uses which employ discriminative and generative methods together. For example, T. S. Jaakkola and D. Haussler describe such use for classifiers in the article, "Exploiting Generative Models In Discriminative Classifiers", *Neural Information Processing Systems (NIPS)* 11, 487-493, 1998. In K. Tsuda, M. Kawanabe and K-R Muller's article, "Clustering with the Fisher score", *Neural Information Processing Systems (NIPS)*, 2002, Fisher scores are obtained from a learned generative model and are used for classification and clustering purposes. The article by S. Tong and D. Koller, "Restricted Bayes Optimal Classifiers", *National Conference on Artificial Intelligence (AAAI)*, 2000, proposed a notion of restricted Bayes optimal classifiers in which the Bayes optimal classifiers are adjusted according to maximum margin classification criteria, and the article by R. Raina, Y. Shen, A. Y. Ng and A. McCallum, entitled "Classification With Hybrid Generative/Discriminative Models", *Neural Information Processing Systems (NIPS)* 2003, employed naive Bayes and logistic regression as a "generative-discriminative" pair and applied it to document classification. However, the above concepts are not particularly applicable to improving the accuracy and case of use of optical character recognition issues, to which the present application is directed.

Most commercial optical character recognition (OCR) tools focus on general character shapes and are not flexible enough to adapt to specific application settings, especially on images with noise and clutter such as shown in FIG. 1. Retrainable font-specific approaches appear to provide the greatest accuracy when the font is known. However, training example preparation is usually requires a highly skilled technician, and even then it is a tedious and often prohibitively expensive manual effort. Therefore, recent research in the field has focused on ease of training preparation, especially on noisy images. P. Sarkar and H. S. Baird, in "Decoder Banks: Versatility, Automation, And High Accuracy Without Supervised Training", *Int'l Conf. on Pattern Recognition (ICPR)*, volume 2, 646-649, 2004, used a decoder bank that was composed of an array of pre-trained fonts, to avoid supervised training. To remove the need for ground truth in training, H. Ma and D. Doermann, in "Adaptive OCR With Limited User Feedback", *Int'l Conf. on Document Analysis and Recognition (ICDAR)*, 814-818, 2005, proposed a methodology to cluster images of the same glyph, while J. Edwards and D. Forsyth, in an article entitled, "Searching for Character Models", *Neural Information Processing Systems (NIPS)*, 2005, iteratively improved a character model by gathering new training data from high confidence regions. Ground truth is intended herein to refer to training data (examples) which are correctly labeled according to the categories they fall into.

In studying a commercial setting where an OCR solution is needed for images with printed characters that vary only slightly in font shape, but include severe degradation, as shown in FIG. 1, it has been found that template-based techniques have superior robustness to noise and clutter. Nevertheless, template based techniques have their own limitations. A font template solution that is based on the independent bit flip model was proposed by G. E. Kopec in "Multilevel Character Templates For Document Image Decoding", *Document Recognition IV, SPIE* 3027, 1997. This solution is, however, found to be too sensitive to variations in font shapes and degradations. If this drawback is attempted to be addressed by a decoder bank of templates that are trained for all possible font variations and degradations, then the tedious and difficult tasks of categorizing glyph images according to fonts and degradations need to be undertaken, which lowers the practicability of such a system.

The above considerations have therefore made it appear useful to search for a better scheme that is less sensitive to variation in fonts and degradations.

SUMMARY

A method employing a hybrid classification model is used to perform optical character recognition operations for an image. Image data from the image is provided to a generative classification model of the hybrid model, and generative image classifications operations are performed, generating a feature data set which is outputted from the generative classification model. This feature data set is then provided to the discriminative classification model, and discriminative classification operations are performed to generate a classification of the image.

BRIEF DESCRIPTION OF THE DRAWINGS

FIG. 1 illustrates examples of noisy document image segments to which the present application may be applied for decoding;

FIG. 5 is a table showing examples of several fonts at different degradation levels;

FIG. 6 details a parametric probabilistic template for a given glyph;

FIG. 8 is a classification table to classify the accuracy comparison among several character recognition methods;

FIG. 9A is a table showing measures of robustness against new classes;

FIG. 9B shows the dominative confusion pairs from the robustness test results of FIG. 9A.

DETAILED DESCRIPTION

Figure 2:
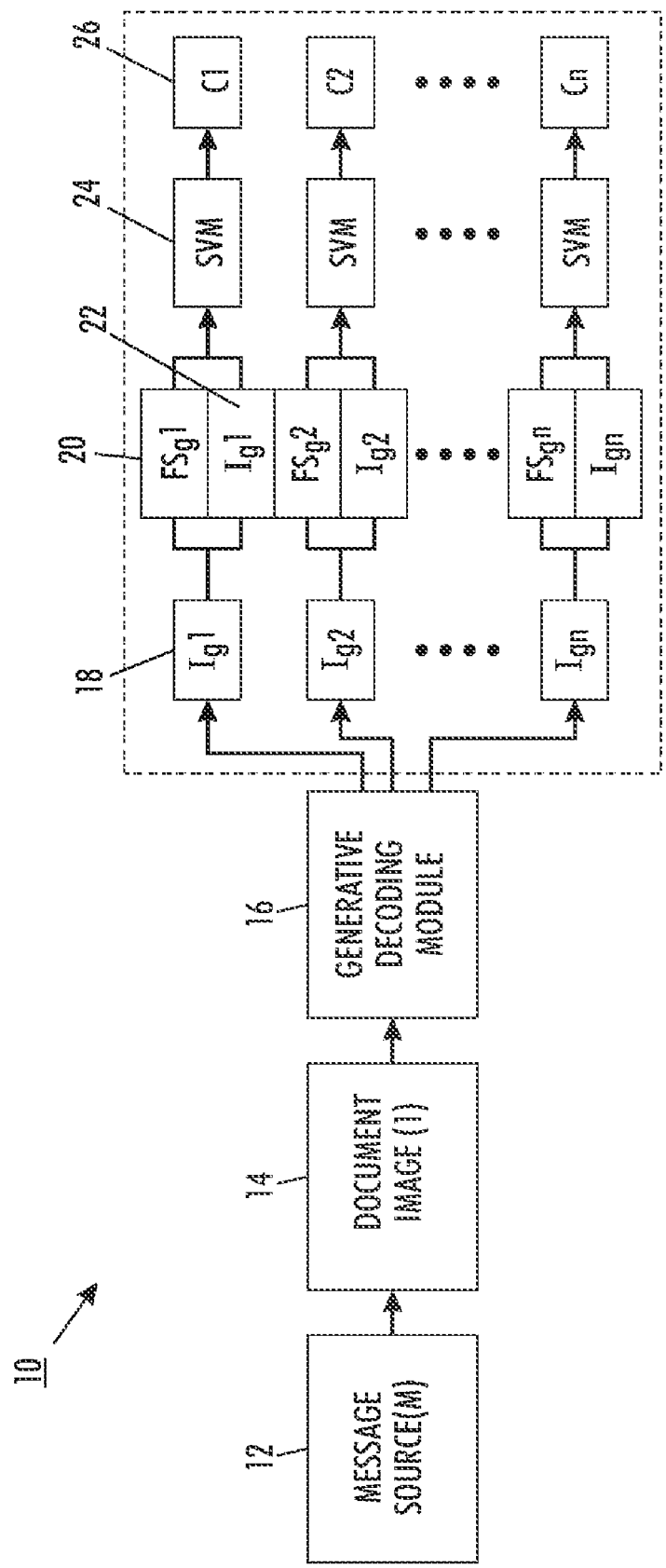
FIG. 2 illustrates a proposed framework of a hybrid system according to the concepts of the present application.

As detailed above, existing Optical Code Recognition (OCR) solutions are still unsatisfactory especially on noisy images. Template-based OCR techniques have been shown to have superior robustness to noise and clutter. They nevertheless have their own limitations. A font template solution that is based on the independent bit flip model, such as Document Image Decoding (DID) as disclosed in U.S. Pat. No. 5,321, 773, entitled "Image Recognition Method Using Finite State Networks", by Kopec et al., incorporated herein by reference in its entirety, is sensitive to variations in font shapes and degradations if the trained font is different from the target font. To address these shortcomings, a potential solution is "font-specific" OCR, which requires a current DID solution to have the training examples be categorized according to fonts and degradation. Such distinctions require highly skilled human operators.

To overcome these issues and other, the following discussion discloses methods and systems that organically combine a generative classification model with a discriminative classification model via a Fisher kernel, where Fisher score vectors of maximum likelihood-based font templates from the generative classification model are used as the feature input to the discriminative classifier model, configured in one embodiment such as support vector machine.

A further embodiment employs reasonable restrictions on the font templates (to a multilevel model), and on the kernel of the generative classifier model, to reduce the dimension of the feature input to no more than the size of the union of bounding boxes of the font templates multiplied by the number of the levels in the font templates. Experiments have shown that hybrid models which employ these methods and systems work significantly better than methods that use only a generative classifier model, only a discriminative classifier model, or a naive combination of the two. The solution maintains the advantages of fixed-template OCR (such as Document Image Decoding (DID)) while making the system more generalizable to font and degradation variations.

Section 1 of the following discussion discloses tools used to form the hybrid model, a generalized system for a hybrid model of the present application, and finally, particular methods for training and operation of the system. Sections 2-4, expand upon the operations described in Section 1.

1. Tools, System and Methods of Operation

The to-be-described methods and systems employ the following tools:

(i) A reliable layout analysis tool to locate text lines in a document image, and a reliable segmentation tool to segment text lines into individual characters. In the present embodiments, a heuristic tool is used to locate the text lines and DID is used to perform character segmentation. Any other reliable layout analysis tool and segmentation tool may also be used.

(ii) A tool to generate a probabilistic template for each character. In the present embodiments, an Expectation Maximization (EM) training tool of DID is used to perform template estimation. Any other probabilistic template estimation tool can be used as well.

(a) In particular, it is assumed that the observed images are binary, where each pixel location $P(i, j) \in 0,1$. A probabilistic template $T_c$ is estimated for each glyph from m possible alphabets and the model parameter is denoted as $\theta_c = \{h_c, w_c, \theta_c: |\{c\}| = m\}$, where $h_c$ and $w_c$ are height and width of $T_c$ respectively, in pixels. Specifically, $T_c$ is constructed as an independent bit-flip model (for example, as will be shown in FIG. 6), in which $\theta_c$ forms a two dimensional array, a component of which, $\theta_c(i,j)$ ($i \in [1,h_c], j \in [1,w_c]$), gives the probability of the pixel at location (i,j) being a black pixel in $I_c$, an observed image of glyph c. In other words, $\theta_c(i, j)$ describes a random variable that follows a Bernoulli distribution, such as:

$$p(I_c(i,j)=q)=\theta_c(i,j)^q(1-\theta_c(i,j))^{1-q}, q \in \{0,1\}. \quad (1)$$

(b) For practical consideration, an even simpler template model of multilevel character templates may be used, in which all templates $T_k$ are "quantized" into the same limited set of possible values. For example, DID uses 4-level templates by default.

(c) For a parameterized model $L(X;\Theta)$, where $\Theta$ is the model parameter and X is the input, its Fisher score is the vector of partial derivatives with respect to its model parameter. The following equation:

$$\frac{\partial}{\partial \Theta} \log L(X; \Theta_{MLE}), \quad (2)$$

where $\Theta_{MLE}$ is the maximum likelihood estimate of $\Theta$, gives the Fisher score vector of model L at the point where it is estimated to maximize its likelihood. Applying the above to Equation 1, it is found:

$$\phi_{c,i,j}(I_g) = -\frac{I_g(i, j) - \theta_c(i, j)}{\theta_c(i, j)(1 - \theta_c(i, j))} \quad (3)$$

(iii) A multi-class discriminative classifier. In the present embodiments, a Library for Support Vector Machines (LibSVM) is used as a software tool for support vector machine SVM training and predicting. Any other discriminative classifier, for example, multi-class logistic regression, can also serve the same role. Also used is a Radial Basis Function (RBF) kernel, as follows:

$$K(x,z)=\exp(-\gamma\|x-z\|^2) \quad (4)$$

It is, however, to be appreciated that the methods of this application do not require use of the kernel. In one particular embodiment, a multi-class discriminative classifier that is based on coupling of the outputs of 1-against-1 pairwise classifiers may be selected, for the following reasons:

(a) As described later, a series of classifiers is needed for certain subsets of the classes. Such a multi-class classifier, whose coupling algorithm is not learned, provides the flexibility of constructing multi-class classifiers of any subsets without incurring extra training.

(b) If a new class is added into the system, for the same reason that the coupling algorithm is not learned, it is not necessary to retrain the discriminative model from scratch. Instead, only the pairwise discriminative classifiers that involve the new class need to be trained.

1.2 System Overview

FIG. 2 provides a framework for operation of a system for the hybrid model 10 in accordance with the concepts of the present application. Initially, it is assumed there is an underlying Message Source block 12 which generates a finite string (M) of data selected from a pool of candidate data strings according to a prior distribution: $p(M:\alpha)$. The strings are converted in a Document Image block 12 into a document image (I). Information of the document image is provided to Generative Decoding Module block 18, which segments the document image (I) into a sequence of Image Patch blocks $(I_{g1}$-$I_{gn})$ 16 for each glyph. Then, the data in the image patches are provided to respective Fisher Scoring Module blocks 20 and Likelihood Vector Analysis Module blocks 22, which operate to extract the corresponding Fisher score $(FS_{g1}$-$FS_{gn})$ and the Likelihood $(L_{g1}$-$L_{gn})$ vectors of each glyph template. Thereafter, obtained Fisher scores and Likelihood ratios are provided to respective discriminative module blocks 24, which in this embodiment are trained as support vector machines (SVM) to predict each image's class label, and then to output the predictions to class label output blocks 26, i.e., class labels $c_1$-$c_n$.

1.3 Training Method

Figure 3:
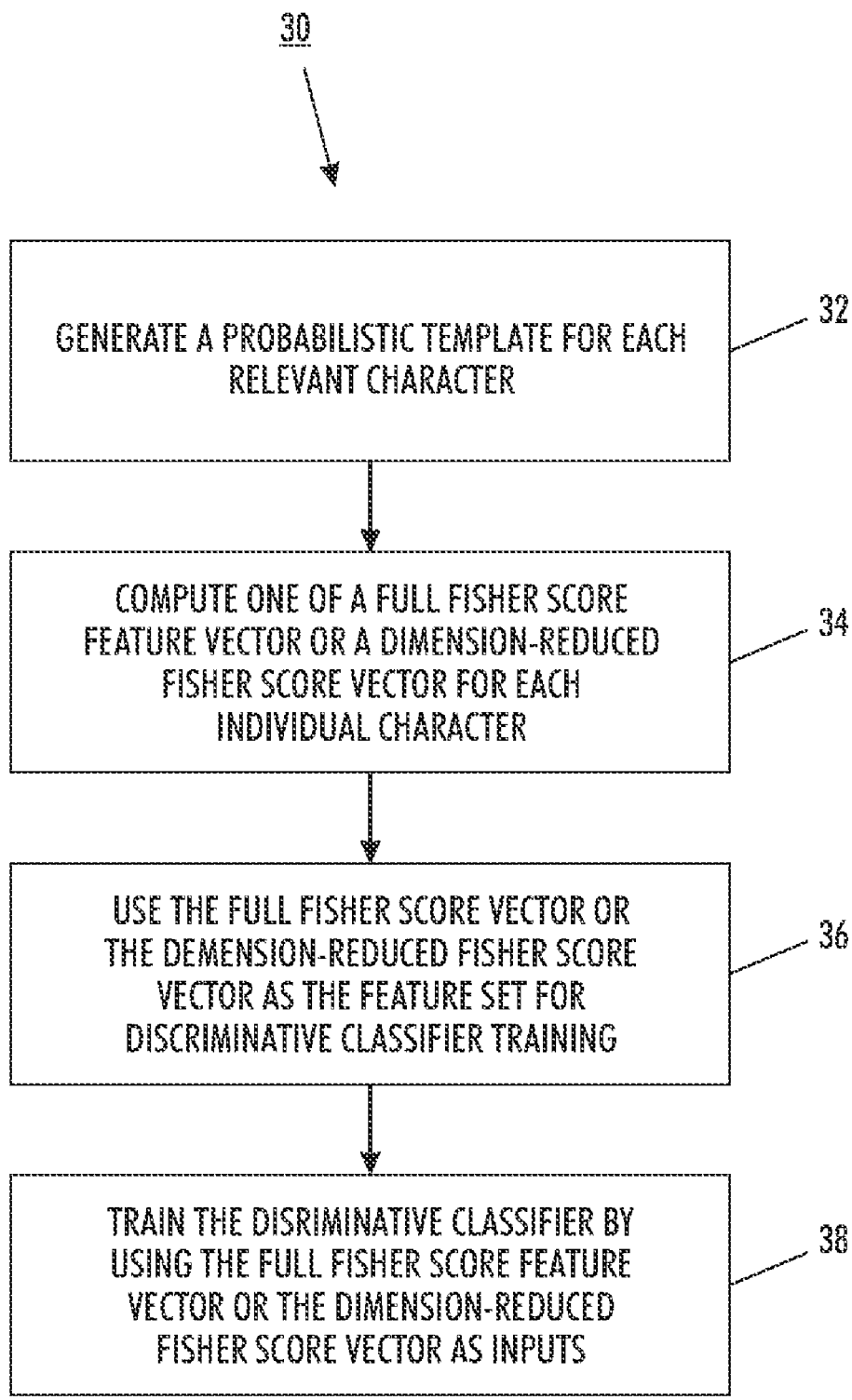
FIG. 3 is a flow diagram for training a hybrid system according to the concepts of the present application and as shown in FIG. 2.

Having presented the framework of the proposed hybrid system, the following section describes outline for training such a system. More particularly, turning attention to FIG. 3, illustrated is a flow diagram 30 which provides a training process in conformance with the concepts of the present application.

(i) In step 32, a tool of choice is used to generate a probabilistic template for each character in an alphabet system, number system or other symbol. This step may use a layout analysis tool, a segmentation tool, and some human involvement to prepare training examples.

(ii) In step 34, for each individual character, a Fisher score based feature vector is computed in the following way:

(a) For each template $T_k$, place the template over the segmented character, left and top aligned, or aligned at the displacement of maximum likelihood. The Fisher score component at pixel (i, j) is then computed as:

$$\phi_{c,i,j}(I_g) = -\frac{I_g(i,j) - \vartheta_c(i,j)}{\vartheta_c(i,j)(1-\vartheta_c(i,j))} \quad (5)$$

The Fisher scores of all the glyph templates are concatenated into one single vector to form the feature mapping function, $$\Phi(I_g)=(\phi_{c,i,j}(I_g))_{(c=1,i=1,j=1)}^{(m,h_c,w_c)} \quad (6)$$

Note that the dimension/size of each type of glyph can be different. Therefore a RBF Fisher kernel can be constructed for glyph images $I_s$ and $I_t$ over $\Phi(I)$:

$$K(I_s, I_t) = \exp(\gamma\|\Phi(I_s) - \Phi(I_t)\|) \quad (7)$$

(a') Alternatively, substituting (5) into (7)

$$K(I_s, I_t) = \exp\left(\gamma \sum_{c,i,j} \frac{(I_s(i,j) - I_t(i,j))^2}{\vartheta_c^2(i,j)(1-\vartheta_c)^2}\right) \quad (8)$$

$$K(I_s, I_t) = \exp\left(\gamma \sum_{i,j} w^2(i,j)(I_s(i,j) - I_t(i,j))^2\right) \quad (9)$$

Where $$w(i,j) = \left(\sum_c \frac{1}{\vartheta_c^2(i,j)(1-\vartheta_c)^2}\right)^{-\frac{1}{2}} \quad (10)$$

From equations 8 to 9, all $\theta_c(i,j)$ terms are collected into a weighted map $w(i,j)$ as in the last equation. Each template $\theta_c$ is padded (with 0.5) to the size of the union of all templates (aligned at the upper left corner, or the displacement of maximum likelihood). The dimension of the feature space is the same as that of a template, regardless of the number of the templates. the kernel "emphasizes" the differences of two data items in locations where the pixel values are highly definitive.

Rewriting the RBF Fisher kernel as a standard Radial Basis Function (RBF) kernel, $K(I_s,I_t)=\exp(\gamma\|\hat{I}_s-\hat{I}_t\|^2)$ where $\hat{I}(i,j)=w(i,j)I(i,j)$, standard learning software can be used to learn a classifier with little extension in the Fisher kernel induced feature space. In a prototype configured in accordance with the present concepts, a Library for Support Vector Machines (LibSVM) is used to learn a support vector machine (SVM) model. $\gamma$ is chosen to be 0.0019. Depending on the application, either the "one vs one" (1-vs-1) or "one vs all" (1-vs-all) strategy, or a combination of them, for multi-class classification. The "one vs all" strategy is sometimes preferred as it is allowed to classify a sample as "unknown class", which is necessary for on-line training of the system. In applications described earlier, training data often does not cover all possibilities.

To discriminate between two classes, the weight map is further regulated by the magnitudes of the differences between their templates, as follows:

$$w(i,j) = \left(\sum_{c=0,1} \frac{(\vartheta_0(i,j) - \vartheta_1(i,j))^2}{\vartheta_c^2(i,j)(1-\vartheta_c)^2}\right)^{-\frac{1}{2}} \quad (11)$$

Note that $w(i,j)$ may be very high if $\theta(i,j)$ is very close to either 0 or 1. And a few entries with spiking values may dominate in kernel evaluation. Hence it will be useful to regulate the template, preferably, in some embodiments, with a layered model that is maximum likelihood estimated, which can be obtained by EM training. In this description, heuristic techniques are used to regulate the weight map (e.g., clipping high spikes). The weights to [0,1] are then normalized.

(iii) Next, in step 36, the full Fisher score vector, or the dimension-reduced Fisher score vector is used as the feature data set for discriminative classifier training.

Finally, in step 38, $$\left(\begin{matrix}M\\N\end{matrix}\right)$$

classifiers are trained for all possible subsets of N classes (typically, N is 2 or 3), where M is the number of all classes (e.g., the size of the alphabet, number system, etc.). For software tools such as LibSVM, this is equivalent to training one single classifier for all classes.

1.4 Prediction Method

Figure 4:
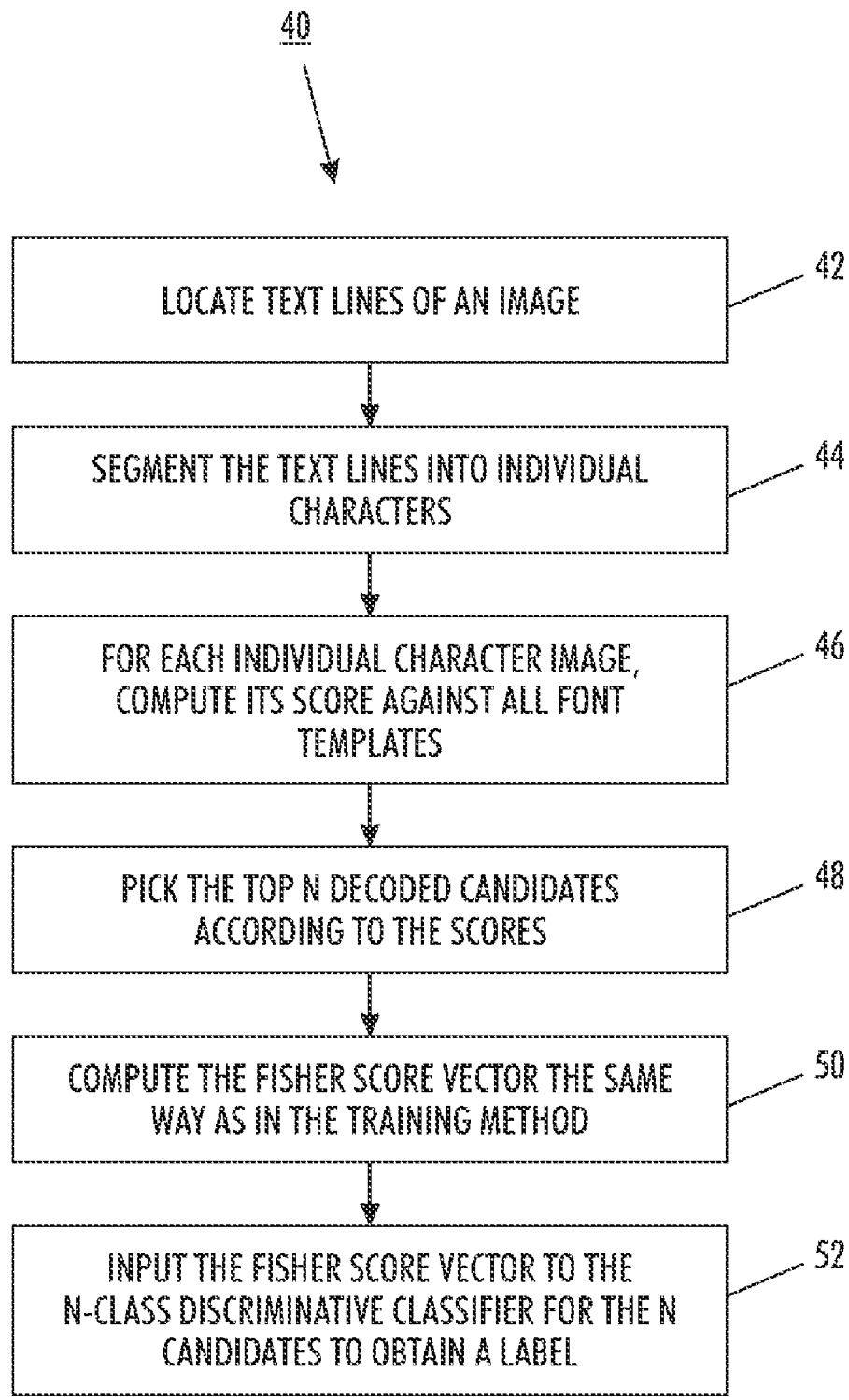
FIG. 4 depicts a prediction method wherein the hybrid system of the present application has been trained in accordance with the methods such as in FIG. 3, and is now used to perform its classification operations (e.g., obtain a label for a character.

Once the hybrid models of the present application have been trained, they may be used to undertake the prediction/classification operation for optical character recognition, such as shown in the flow diagram 40 of FIG. 4.

(i) In step 42 the layout tool is used to locate the text lines, and in step 44 the segmentation tool is used to segment the text lines into individual characters.

(ii) In step 46, for each individual character image, scores are computed against all font templates, and in step 48, the top N decoded candidates are picked according to the scores. Next, in step 50, the Fisher score vector is computed the same way as in the training step (e.g., see Section 1.3), and in step 52, the Fisher score vector is used as an input to the N-class discriminative classifier for the N candidates, to obtain a label.

The described systems and methods of the hybrid model are easier to train when compared to other template-based solutions. One way to attempt to increase OCR accuracy of existing solutions is to adapt to the font types and the degradation levels of the target document images through system training. However, as previously mentioned, training data preparation is a high-skill, tedious, and thus often a prohibitively expensive manual effort. For example, in existing solutions such as DID, one needs to provide the baselines and the transcripts of the text lines, and to categorize the text lines according to their font types and degradation levels. From experience, it is known the most difficult and tedious manual effort is to categorize fonts of similar sizes and similar designs, and to separate degradation levels that often form a continuum.

Compared to a pure template-based generative solution (such as DID), the methods and systems for the newly presented hybrid models have a far weaker requirement in categorizing training examples—one only needs to categorize training examples into different sizes, and dramatically different designs. With that advantage, it is significantly easier for an operator to prepare training examples, as they do not need to distinguish subtle details between font variations and degradation levels. It also makes it more likely to design a clustering algorithm to prepare training examples automatically, which categorizes character image examples according to their similarity.

The table of FIG. 5 shows examples of several fonts in different degradation levels. They are roughly the same size, but are different from each other in their shapes. With the DID method, it would be necessary to train at least 8 fonts in order to achieve high accuracy, and hence the training example would need to be sorted into 8 categories. With the newly proposed systems and methods, only one font needs to be trained, and the accuracies of classification will be on par or higher with existing systems.

It is also to be appreciated that the disclosed systems and methods can be parameterized to trade-off between the number of true positives and the number of false positives during classification operations.

Based on the above and following discussions, it will also be seen that several variations or alternatives of the present concepts may be employed.

(i) The pixel values of the training examples may be used as the feature set for the discriminative classifier.

(ii) The scores of all the character templates on one character image may be used as the feature set for the discriminative classifier.
  a. If the character templates are likelihood based, then the feature set is the logarithmic likelihoods of this observed character being each of all the possible characters.
  b. Alternatively, the DID scores of all the character templates are used as the feature set for the discriminative classifier.

The above discussion presents the systems and methods according to concepts of the present application. Sections 2-4, expand on the disclosed details by which the systems and methods are obtained.

2. The Fisher Kernel and Generative Models as Related to Hybrid Methods and Systems of the Present Application In the context of pattern classification, when generative models serve solely as classifiers, e.g., making decisions based on likelihood, it is known to be challenging for the generative classifiers to express within class pattern variations, especially when no invariant feature is at hand.

Further, under a generative model, likelihood can be a poor metric for the purpose of data classification, as two very different data samples could be given the same probability by the model without an indication of their differences. By contrast, the Fisher kernel extracts richer information about the inner representation of each data item within the model and ties it to a generative process. More specifically, as the data information is summarized in the feature space, each feature, e.g., ($\phi_i$) can be constructed according to the effect of perturbation of each model parameter $\theta_i$ around a given model setting $\hat{\theta}_i$, which usually can be obtained by a maximum likelihood estimation. Mathematically, the feature functions are defined as:

$$\Phi(x, \Theta) = (\phi_i(x; \Theta))_{i=1}^n = \left(\frac{\partial \log p(x \mid \Theta)}{\partial \theta_i}\right)_{i=1}^n, \quad (12)$$

where $\Theta = (\theta_1 \ldots, \theta_n)$ is the model parameter vector, and n is the number of parameters or, equivalently, the feature space dimension.

The feature vector in Equation 12 in Section 2.1 includes the gradients of the log-likelihood function with regard to each model parameter. It is also called a Fisher score, which is considered the "gold standard" for unbiased estimators. With the Fisher scores evaluated at a given model $\hat{\Theta}, \Phi(x, \hat{\Theta})$, two data items can be compared at each relevant aspect of the generative process. If the two corresponding Fisher score vectors are similar, the two data items are usually close from the viewpoint of the generative model.

Since the mid-1990s, kernel methods have become powerful tools in pattern analysis, and kernel-based learning approaches are used to provide an efficient way to analyze nonlinear distributions in high dimensional feature spaces.

Thus, the Fisher score derived from generative models can provide a comprehensive evaluation from the viewpoint of the generative process. In consideration of the above concepts, the present application describes hybrid methods and systems that organically combine generative models with discriminative classification via a Fisher kernel in the context of decoding noisy document images. The new methods and systems exploit the advantages of template-based generative models to achieve significantly higher accuracy, while making the system more generalizable to variations in patterns and image degradation, e.g., as shown for example in FIG. 1. The concepts disclosed herein can be applied to many areas such as, but not limited to, text mining, information redaction and camera based text processing.

In this description a kernel matrix with the Fisher score vectors are generally defined as:

$$K(x_i,x_j)=\exp\{\gamma\|\phi(r_i)-\phi(r_j)\|^2\}. \quad (13)$$

and which is called herein a RBF Fisher kernel.

3. Hybrid Method and System Embodiments in Accordance with the Present Application

3.1 The Generative Module

As previously discussed in Section 1, FIG. 2 illustrates a diagram of a hybrid system for decoding noisy document images in accordance with the present application. The generative module consists of two parts: (i) the Generative Message Source block 10 converting strings of data into a document image I, and (ii) the generative models for glyphs 16. For completeness of presentation, the following discussion will formulate the problems of learning the generative message source and the generative models in the context of document image decoding.

3.1.1 Learning the Generative Model for Strings

Initially it is assumed there is an underlying "message source" generating a finite string $M=(c_i, i=1, \ldots, N)$ selected from a pool of candidate strings according to a prior distribution $p(M;\alpha)$. By factorization, the probability (prior) model for strings (i.e., the message source) is defined as:

$$p(M;\alpha) = p(N) \cdot p(c_1) \prod_{i=2}^{N} p(c_i \mid c_{i-1}) \quad (14)$$

The prior model parameter $\alpha$ of prior distribution $p(M;\alpha)$ can easily be learned from given ground truth strings by collecting statistics such as the length of the strings, the transition probability of adjacent glyphs $p(c_i|c_i-1)$ and the probability of starting glyphs for each string $p(c_1)$.

3.1.2 Generative Models for Glyph

Figure 6:
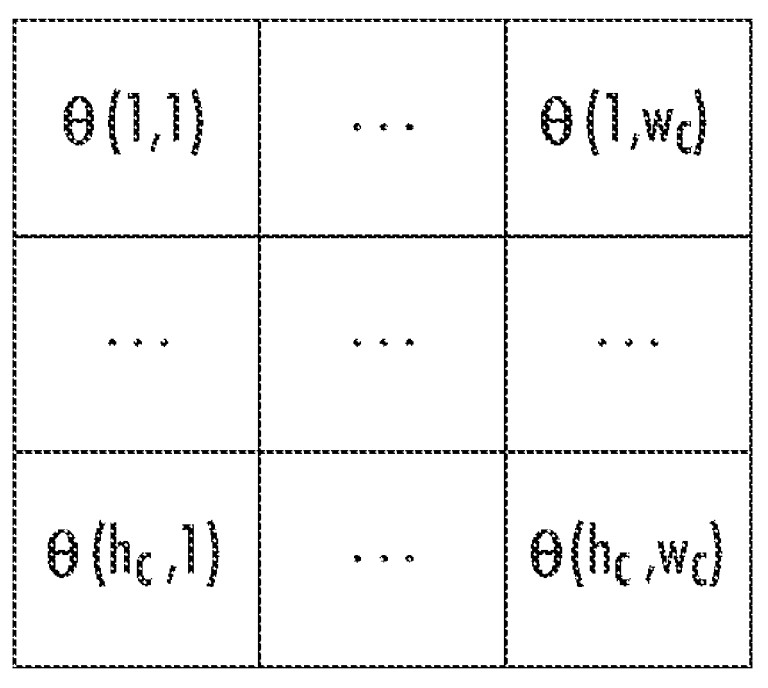

Next, the generative models for glyphs are described, under the assumption the document images are binary, i.e., each pixel of an image is either 0 or 1. Under this assumption a probabilistic template $T_c$ is estimated for each glyph from m possible character types (e.g., alphabets, numbers, symbols) and the model parameter is denoted as $\theta_c=\{h_c,w_c,\theta_v: |\{c\}|=m\}$, where $h_c$ is height and $w_c$ is the width of $T_c$, in a pixel. Specifically, $T_c$ is constructed as an independent bit-flip model as shown in FIG. 6, in which the model parameter $\theta_C$ forms a two dimensional array, a component of which, $\theta_c(i,j)(i\in[1,h_C],j\in[a,w_C])$, gives the probability of the pixel at (i, j) being a black pixel in $I_c$, an observed image of glyph c. In other words, $\theta_c(i,j)$ describes a random variable that follows a Bernoulli distribution, such as:

$$p(I_c(i,j)=q)=\theta_c(i,j)^q(1-\theta_c(i,j))^{1-q}, q\in\{0,1\} \quad (15)$$

The probability of a glyph image $I_g$ given glyph c is then given as the product of the likelihood of each pixel:

$$p(I_g \mid c; \theta_c) = \prod_{i=1,j=1}^{h_c,w_c} \vartheta_c(i, j)^{I_g(i,j)}(1 - \vartheta_c(i, j))^{1-I_g(i,j)} \quad (16)$$

Learning of the generative model is posed as a maximum likelihood estimation (MLE) problem. First, a document image I is parsed into text lines by standard methods. Given the ground truth (e.g., glyphs) τ, the challenge to learn the parameters for these models lies in the segmentation of the text line images into a number of glyph images $I_g$. The number of glyphs is known from the given ground truth. The segment of the text line image is treated as a hidden variable $S=(S_i)_{i=1}^N$, where N is the number of glyphs and $s_i$ is the segmentation or bounding box for glyph i. In model learning, S needs to be integrated out. As a result, the MLE learning is formulated as follows:

$$\Theta^* = \mathrm{argmax}\log p(I \mid \tau; \Theta) \quad (17)$$
$$= \mathrm{argmax}\log \int p(I, S \mid \tau; \Theta) dS.$$

By taking the derivative with respect to Θ, setting it to zero, and performing additional steps of derivation, for following is defined:

$$E_{p(S|I,\tau;\Theta)}\left|\frac{\partial}{\partial\Theta}\log p(I, S \mid \tau; \Theta)\right| = 0. \quad (18)$$

Thus, the MLE learning problem is solved by the standard Expectation and Maximization (EM) algorithm, which iterates the following two steps:

(i) impute the hidden variable S to segment a given document image I into glyph images according to the posterior $p(S|I,\tau,\Theta)$, and (ii) update the generative model parameters for each glyph $\theta_c$.

In one embodiment of the systems and methods, an EM trainer which is known in the art is used to estimate the generative models for glyphs.

3.2 The Discriminative Models

3.2.1 Fisher Scores and the Fisher Kernel

Equation 16 describes a generative model, smoothly parameterized in $\theta_c(i,j)$. From Equation 13, each component of the Fisher score of the model therefore is defined as:

$$\phi_{c,i,j}(I_g) = -\frac{I_g(i, j) - \vartheta_c(i, j)}{\vartheta_c(i, j)(1 - \vartheta_c(i, j))} \quad (19)$$

By examining Equation 19, it may be seen by one of ordinary skill in the art why Fisher scores are good features for discriminative classification. It is easy to see the Fisher score vectors of data that match the generative model tend to cluster near the origin of the vector space, while that of mismatching data tend to scatter further from the origin. The magnitude of the mismatch is magnified greatly by either $1/\theta_c(i,j)$ or $1/(1-\theta_c(i,j))$, when $\theta(i,j)$ is close to 0 or close to 1, i.e. a pixel location that is most likely to be black or white. Based on the above intuition on the spatial pattern characteristics, the RBF kernel is chosen to separate the clusters in a Fisher score vector space, explained as follows.

The Fisher scores of all the glyph templates are concatenated into one single vector to form the feature mapping function, $$\Phi(I_g) = (\phi_{c,i,j}(I_g))_{(c=1,i=1,j=1)}^{(m,h_c,w_c)} \quad (20)$$

Note that the dimension/size of each type of glyph can be different. Therefore a RBF Fisher kernel can be constructed for glyph images $I_s$ and $I_t$ over $\Phi(I)$, $$K(I_s, I_t) = \exp(\gamma \|\Phi(I_s) - \Phi(I_t)\|) \quad (21)$$

$$K(I_s, I_t) = \exp\left(\gamma \sum_{c,i,j} \frac{(I_s(i,j) - I_t(i,j))^2}{\vartheta_c^2(i,j)(1-\vartheta_c)^2}\right) \quad (22)$$

$$K(I_s, I_t) = \exp\left(\gamma \sum_{i,j} w^2(i,j)(I_s(i,j) - I_t(i,j))^2\right) \quad (23)$$

Where $$w(i,j) = \left(\sum_c \frac{1}{\vartheta_c^2(i,j)(1-\vartheta_c)^2}\right)^{-\frac{1}{2}} \quad (24)$$

14. The hybrid classification model of claim 13, wherein the discriminative classification model employs a kernel, and the kernel of the discriminative classification model is a function of outputs matching each of the font templates with an observed character image.

15. The hybrid classification model of claim 9, wherein the feature data set is a feature vector defined as:

$$\phi_{c,i,j}(I_g) = -\frac{I_g(i,j) - \vartheta_c(i,j)}{\vartheta_c(i,j)(1-\vartheta_c(i,j))}, \quad (3)$$

where $I_g(i,j)$ is the pixel value at location (i,j) of the observed character image, and $\theta(I)$ is an estimated value derived from the character templates.

16. The hybrid classification model of claim 11, wherein the kernel of the discriminative classification model is a function of a Fisher score of the generative classification model, given as:

$$K(I_s, I_t) = \exp(\gamma \|\Phi(I_s) - \Phi(I_t)\|) \quad (7)$$

where K denotes the function, $I_s$ is one image patch, $I_t$ is a second image patch, $\gamma$ is an adjustable parameter, and $\Phi$ is a feature vector.

17. A computer program product, operative in a data processing system and implemented on a computer readable medium for classifying an image comprising:
providing image data of the image to a generative classification model;
performing generative image classification operations on the image data by the generative classification model;
outputting a feature data set of the image data;
providing the feature data set to a discriminative classification model;
performing discriminative classification operations on the provided
From equations 21 to 22, all $\theta_c(i,j)$ terms are collected into a weighted map w(I,j) as in the last equation. Each template $\theta_c$ is padded (with 0.5) to the size of the union of all templates (aligned at the upper left corner, or the displacement of maximum likelihood). The dimension of the feature space is the same as that of a template, regardless of the number of the templates. the kernel "emphasizes" the differences of two data items in locations where the pixel values are highly definitive.

Rewriting the RBF Fisher kernel as a standard RBF kernel, $K(I_s, I_t) = \exp(\gamma \|\hat{I}_s - \hat{I}_t\|^2)$ where $\hat{I}(i,j) = w(i,j)I(i,j)$, standard learning software can be used to learn a classifier with little extension in the Fisher kernel induced feature space. In a prototype configured in accordance with the present concepts, LibSVM is used to learn a support vector machine (SVM) model. $\gamma$ is chosen to be 0.0019. Depending on the application, either the "one vs one" (1-vs-1) or "one vs all" (1-vs-all) strategy is used, or a combination of them, for multi-class classification. The "one vs all" strategy is sometimes preferred as it is allowed to classify a sample as "unknown class", which is necessary for on-line training of the system. In earlier described applications, training data often does not cover all possibilities.

To discriminate between two classes, the weight map is further regulated by the magnitudes of the differences between their templates, as follows:

$$w(i,j) = \left(\sum_{c=0,1} \frac{(\vartheta_0(i,j) - \vartheta_1(i,j))^2}{\vartheta_c^2(i,j)(1-\vartheta_c)^2}\right)^{-\frac{1}{2}} \quad (25)$$

Note that w(i,j) may be very high if $\theta(i,j)$ is very close to either 0 or 1. And a few entries with spiking values may dominate in kernel evaluation. Hence it will be useful to regulate the template, preferably, in some embodiments, with a layered model that is maximum likelihood estimated, which can be obtained by EM training. In this description, heuristic techniques are used to regulate the weight map (e.g., clipping high spikes). The weights to [0,1] are then normalized.

3.2.3 The Discriminative Classifier

In the Fisher kernel induced feature space of the present embodiment support vector machines (SVM), such as known in the art, are used to learn a classifier of the form, $$y(x) = \text{sign}\left(\sum_i y_i \omega_i K(x_i, x)\right), \quad (26)$$

where $y_i$ is the class label for data $x_i$, $w_i$ is the weight of data $x_i$ learned through the SVM optimization process. Additionally, a library for support vector machines, such as LibSVM is used. Although other such libraries may be used.

3.3 Decoding

Decoding a document image can be roughly subdivided into three tasks: text line extraction, glyph segmentation and glyph decoding. On noisy and cluttered images, it is only effective to perform all or some of these three together iteratively. In this description an approach is provided that combines glyph segmentation with part of the glyph decoding process in an iterative step, which is called herein, iterative generative decoding step. Consequently, the segmented glyph images are decoded by leveraging the generative models' output.

3.3.1 Iterative Generative Decoding

In implementation, standard methods are first used to locate a rough region of text lines. Then, a learned generative module automatically segments I into a sequence of glyph images $I_{gi}$. The challenges of this segmentation procedure lie in two aspects, (i) the number of glyphs N is unknown in the given image, and (ii) the location and segmentation of each glyph is unknown either. For completeness of presentation, in the following of the section, the problem of glyph image segmentation and glyph inference is formulated. The problem is posed as a stochastic inference problem aiming to infer the most probable segmentation S for glyph images $I_g$ from I and a rough estimation for the underlying glyphs covered by the glyph images. The inference procedure is formulated as follows:

$$(S^*, M^*) = \mathrm{argmax}\, p(S, M \mid I; \Theta, \alpha)$$
$$= \mathrm{argmax}\, p(S, M, I; \Theta, \alpha)$$
$$= \mathrm{argmax}\, p(I \mid S, M; \Theta) p(S \mid M; \Theta) p(M; \alpha)$$

$$p(I \mid S, M; \Theta) = \prod_{i=1}^{N} p(I \mid s_i, c_i; \theta_{c_i}) = \prod_{i=1}^{N} p(I_{g_i} \mid c_i; \theta_{c_i}),$$

where $p(I_{gi}|c_i;\phi_{ci})$ is the likelihood of glyph image $I_{gi}$ given a probabilistic model for glyph $c_i$ introduced in Section 3.1.2 Equation 16.

Then, $$p(S \mid M; \Theta) = \prod_{i=1}^{N} p(s_{c_i} \mid c_i; \theta_{c_i}), \quad (28)$$

which is the probability of glyph segmentation given the underlying glyph models introduced in Section 3.1.2. The size of the glyphs is assumed to be a Gaussian distribution. The parameter is learned during the training process.

And, $$p(M; \alpha) = p(N) \cdot p(c_1) \prod_{i=2}^{N} p(c_i \mid c_{i-1}) \quad (29)$$

is the prior model for strings (the message source) previously discussed in Section 3.1.1. In this embodiment, the glyph images are segmented. In one embodiment, the segmenting may be accomplished using an iterated complete path search process, as is known in the art, and described in detail by T. Minka, D. Bloomberg and K. Popat, in "Document Image Decoding Using Iterated Complete Path Search", *Document Recognition and Retrieval VIII, SPIE* 4307, 250-258, 2001.

3.3.2 Discriminative Decoding

M* from the previous step is usually not accurate enough for applications with variation in fonts and degradation (as discussed in the Background of this document). A goal of discriminative decoding is to determine the most probable label at each segment $s_i$*, with discriminative classification. For each glyph image $I_{gi}$, the feature vector of the Fisher kernel is computed according to Equation 23. The vector is then fed into the trained SVM with a RBF Fisher kernel as described in Equation 22 to predict a label.

The robustness of the generative models is further exploited by restricting the discriminating inference to a subset of classes that have high enough likelihood scores, which are "side products" of the generative decoding step. As this embodiment uses a multi-class SVM that is based on coupling of pairwise SVMs, where the coupling algorithm is not learned, it is possible to construct a multi-class SVM of any subset without incurring extra training. The treatment, therefore, is another aspect where the generative process and discriminative process are organically combined.

Experiments have shown that this treatment increases computational efficiency dramatically. On average, it can be inferred on a subset of classes that is 64.2% of the full set, with no trade-off on accuracy.

The same treatment has been used to increase accuracy by excluding labels that are low in likelihood. But the benefit in this area appear negligible, which shows that the Fisher kernel exploits the desirable properties of the generative models.

4. Experimental Results 4.1 Data Set

Data from operation of the described methods and systems has been collected from a commercial application. Source documents are forms with information filled out by dot-matrix printers. There may be misalignment of the form and the filled text, handwritten notes and other clutter. The data set includes 10 digits, 26 capital characters (e.g., English letters) and two symbols "." and "*". There were at least 5 fonts with roughly the same size (16×22 pixels), and the glyphs were in a wide variety of degradation levels.

The training set was picked from a representative set of documents. There were 20,834 digits, 12,617 letters, and 2,155 symbols in the set. The testing set had 18,000 glyphs independent of the training set, and was selected from a set of 10,000 that were representative of the application setting, and a set of 8,000 glyphs that were noisy and hard to decode. The latter were from a set of 1,478 document images that were decoded incorrectly by an earlier system, which used a marginalization kernel and a logistic regression classifier.

4.2 Experiments And Results

Figure 7A:
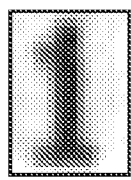
FIG. 7A depicts a learned 4-layered template model for a glyph "1" by MLE.
Figure 7B:
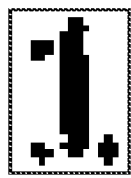
FIGS. 7B-7D represent three samples of glyph "1"
Figure 7C:
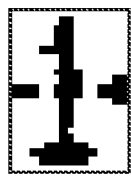
Figure 7D:
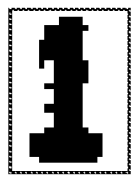
Figure 7E:
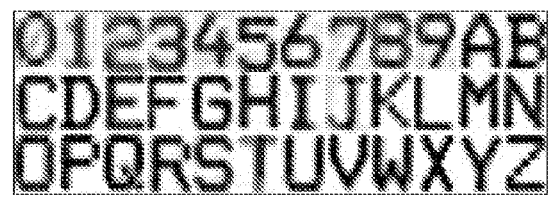
FIG. 7E depicts learned 4-layered templates of alphabet, numeral and symbol glyphs.
Figure 7F:
FIG. 7F is a weight map for glyph "1"
Figure 7G:
FIG. 7G is a weight map of "U" vs "V" for 1-vs-1 classifiers.
Figure 7H:
FIG. 7H show weight maps of all glyphs for 1-vs-all classifiers.

An "averaged" generative template was trained for each of the glyphs by use of maximum likelihood estimation (MLE), with no distinction of font and degradation variations. More particularly, FIGS. 7A-7H are probabilistic templates for glyphs, and weight maps of the RBF Fisher kernel, where the darker parts of the images identify the larger weights. FIG. 7A is the learned template for glyph "1". FIGS. 7B-7D are three (3) different observed instances of glyph "1". FIG. 7E shows the learned templates of all glyphs. FIG. 7F is a weight map for glyph "1". FIG. 7G is a weight map of "U" vs "V" for 1-vs-1 classifiers. FIG. 7H shows weight maps of all glyphs for 1-vs-all classifiers.

In this work, all the values below the medium or the mean (0.5) but not larger than 0.75 are set to zero. In FIGS. 7F, 7G and 7H, which illustrate the weight maps, consists of a dark "skeleton" glyph, surrounded by a light ring, which is in turn surrounded by a dark ring, and the rest are light. The dark "skeleton" and the dark ring capture the dimensions that are important to identify the glyph (black in the skeleton, white in the dark ring). The light ring indicates that those dimensions are not important as shape of the glyph varies. The outer light areas are not important as they are far away from the glyph. FIG. 7G shows the bottom half of the weight map is more relevant as that is where "U" and "V" differs in shape.

Roughly speaking, the complexity of an SVM model can be measured by the number of nonzero entries of the all the support vectors, the fewer the non-zero entries, the faster the prediction speed, and the smaller the memory footprint. Experiments have shown the developed models have significantly less complexity compared to the pure discriminative models that were benchmarked with the Tables of FIGS. 8 and 9A.

Below, the present methods and systems (called "GenDis" in the following paragraphs) are compared with the following alternatives:

1. SVM on Glyph Images (Pixel SVM): classification is directly preformed on the glyph images in pixels. It can be shown that the kernel used this method is a degenerated version of Equation 9 where $\theta_c(i,j)$ is a constant for all characters. For example, we can set it to 0.5.
2. SVM on Likelihood: the marginalization kernel described in Section 3.2.2 is used.
3. Likelihood: The predicted class is the largest likelihood score from the learned generative glyph templates.
4. ABBYY OCR 7.0: Decoded by ABBYY OCR 7.0, one of the best commercial OCR engines.

Two tests have been conducted. The first one measures accuracy in decoding all 36 classes, as reported in the Table of FIG. 8. The second one measures robustness against new classes as reported in the Table of FIG. 9A. In the second test, "one vs all" models are trained for the 10 digits, and are used to decode the test data of new classes of 26 upper case letters. So it is an error if a test sample is decoded as a digit. The complexity of each SVM model in both tests.

From FIG. 8, the following conclusions can be drawn:
1. GenDis achieves the highest accuracy, similar to Pixel SVM and significantly higher compared to the other methods. It is more robust to noise and clutter as shown in FIG. 1.
2. Compared to Pixel SVM, GenDis is more robust to noise, clutter and font variations as shown in FIG. 1, and also more robust to new classes.
3. The Fisher score is a better feature not only indicating the generative process, but also encoding structure/shape information of the data items.

The Table of FIG. 9B shows the dominative confusion pairs from the robustness test detailed in the Table of FIG. 9A. It was found that as they are somewhat similar to each other (see their templates in FIG. 2), the Pixel SVM trained only for the digits cannot distinguish them very well. Using GenDis, however, as the discriminative training is guided by the Fisher kernel based weight map, captures the structures of the digits, and is less likely (except for "O"&"0") to mistake a sample of a new class as one it is trained for.

Experiments were also performed on a decoder bank solution by training 12 digit-only fonts to reasonably cover various degradations of the 5 fonts. The decoding accuracy is slightly worse than that of the SVM on the Likelihood method. A test on the same alphabet as others was not pursued, as the training procedure were too difficult for a commercial application deployment (manual separation of fonts and degradations), and the accuracy is not high enough.

Thus, presented are methods and systems of a hybrid model that exploits the advantages of generative models and discriminative models via a Fisher kernel, in the context of decoding noisy document images. Experiments have shown that the present approaches are significantly better than a method that uses a generative classifier or a discriminative classifier alone, or a naive combination of the two, such as a marginalization kernel. It has also been shown that the approaches are generalizable enough to variation in fonts and degradations, so that ease of training example preparation is increased.

Figure 10:
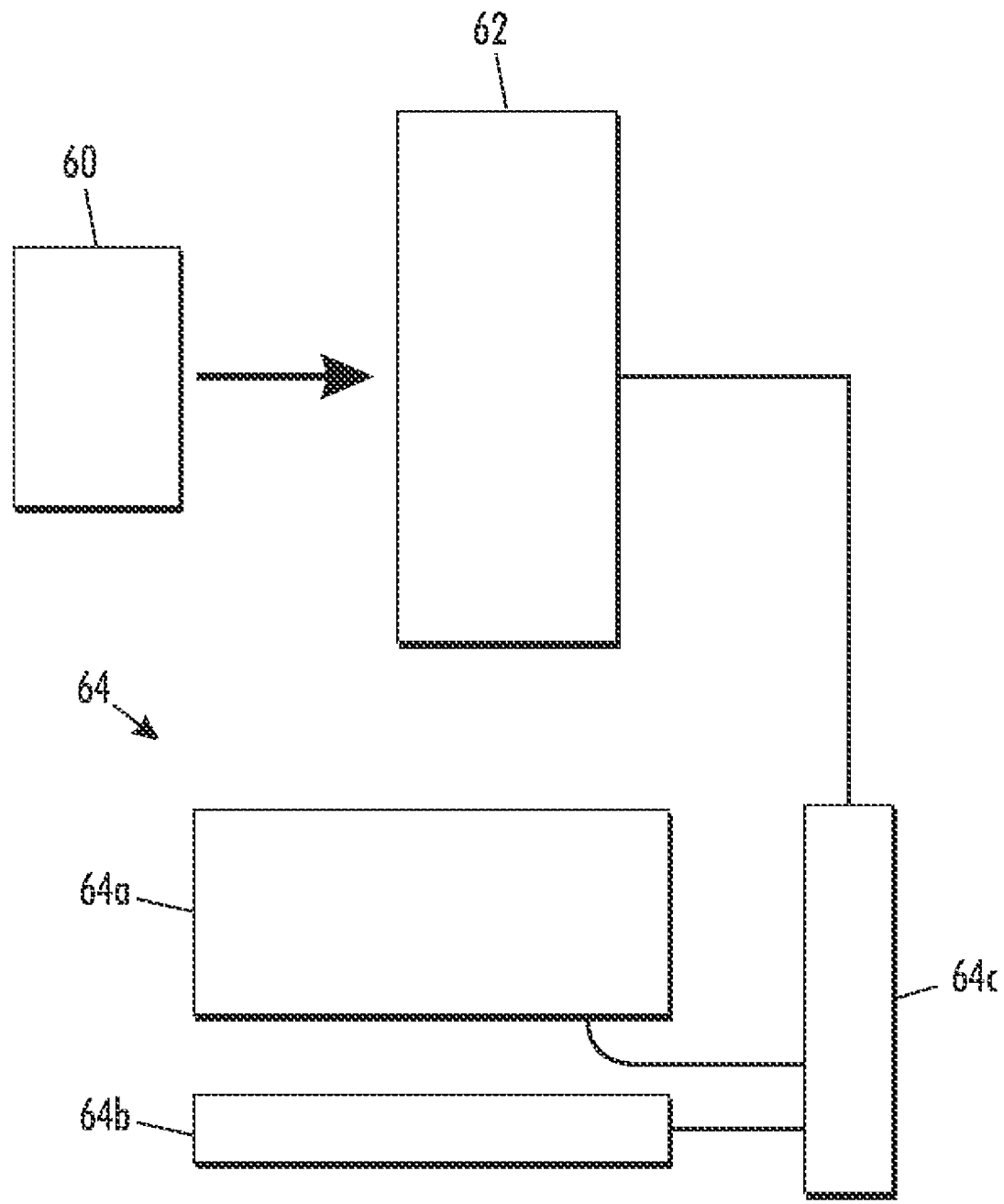
FIG. 10 is a diagram of a system employing the present concepts.

Turning to FIG. 10, set forth is a system in which concepts of the present application may be employed. More particularly, a hard copy image (e.g., a piece of paper with handwritten or computer generated writing) 60 is supplied to a scanner or other device having such capabilities 62 configured to perform optical character recognition. The scanner may be a self-contained unit which performs the entire operation, and/or may be part of or connected to a further device such as a computer system 64, including a display 64a, keyboard 64b and a computing portion 64c, including, among other components, a memory and a controller, such as a CPU. While scanner 62 and computer system 64 may be considered as separate components, various functionality of the scanner and computer system may be incorporated in the other, dependent on the particular implementation. Output from the operation of the scanning and optical recognition may be stored in the memory of the computing position 64c. The output may also be displayed to a viewer on display 64a. As also known in connection with optical character recognition, the output can be further manipulated by the computer system, such as but not limited to further editing by a user.

In operation, hard copy document 60 is provided to scanner 62, wherein image data on document 60 is detected by scanner 62. Thereafter, a program incorporating concepts of the present application may be either stored on scanner 62, and/or stored within computer system 64. In either implementation, the software program employing the concepts of the present application are used to perform the previously discussed optical character recognition operations employing the generative classification model and the discriminative classification model in a combined hybrid model design. Use of the hybrid model results in an improved classification and recognition of images provided to the scanner.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of performing optical character recognition operations on an image:
providing image data of the image to a generative classification model;
using a computer processor, performing generative image classification operations on the image data by the generative classification model;
outputting a feature data set of the image data;
providing the feature data set to a discriminative classification model;
performing discriminative classification operations on the provided feature data set; and
generating a classification of the image;
wherein the feature data set is a feature vector defined as:

$$\phi_{c,i,j}(I_g) = -\frac{I_g(i,j) - \theta_c(i,j)}{\theta_c(i,j)(1 - \theta_c(i,j))} \quad (3)$$

where $I_g(i,j)$ is the pixel value at location $(i,j)$ of the observed character image, and $\theta_c(i,j)$ is an estimated value derived from the character template of character c at Location $(i,j)$.

2. The method of claim 1, wherein the generative classification model is based on character templates.

3. The method of claim 2, wherein the generative classification model employs a likelihood-based font template.

4. The method of claim 1, wherein the generative classification model is a parametric generative classification model.

5. The method of claim 4, wherein the discriminative classification model employs a kernel, and the kernel of the discriminative classification model is a function of outputs matching font templates with an observed character image of the image.

6. The method of claim 4, wherein a kernel of the discriminative classification model is a function of a Fisher score of the generative classification model, given as:

$$K(I_s, I_t) = \exp(\gamma \|\Phi(I_s) - \Phi(I_t)\|) \quad (7),$$

where K denotes the function, $I_s$ is one image patch, $I_t$ is a second image patch, $\gamma$ is an adjustable parameter, and $\Phi$ is a feature vector.

7. The method of claim 1, wherein the discriminative classification model employs a kernel, and the kernel of the discriminative classification model is a function of the output of the generative classification model.

8. A hybrid classification model for optical character recognition, the hybrid classification model comprising:
 a generative classification model stored in computer memory; and
 a discriminative classification model, combined with the generative classification model and configured to use a function data set from the generative classification model;
wherein the feature data set is a feature vector defined as:

$$\phi_{c,i,j}(I_g) = -\frac{I_g(i,j) - \vartheta_c(i,j)}{\vartheta_c(i,j)(1 - \vartheta_c(i,j))},$$

where $I_g(i,j)$ is the pixel value at location (i,j) of the observed character image, and $\theta(l)$ is an estimated value derived from the character templates.

9. The hybrid classification model of claim 8, wherein the generative classification model is a parametric generative classification model.

10. The hybrid classification model of claim 8, wherein the generative classification model is based on character templates.

11. The hybrid classification model of claim 10, wherein a kernel of the discriminative classification model is a function of a Fisher score of the generative classification model, given as:

$$K(I_s, I_t) = \exp(\gamma \|\Phi(I_s) - \Phi(I_t)\|) \quad (7),$$

where K denotes the function, $I_s$ is one image patch, $I_t$ is a second image patch, $\gamma$ is an adjustable parameter, and $\Phi$ is a feature vector.

12. The hybrid classification model of claim 8, wherein the discriminative classification model employs a kernel, and the kernel of the discriminative classification model is a function of the output of the generative model.

13. The hybrid classification model of claim 8, wherein the generative classification model employs a likelihood-based font template.

14. The hybrid classification model of claim 13, wherein the discriminative classification model employs a kernel, and the kernel of the discriminative classification model is a function of outputs matching font templates with an observed character image.

15. A computer program product, operative in a data processing system and implemented on a computer readable medium for classifying an image comprising:
 providing image data of the image to a generative classification model;
 performing generative image classification operations on the image data by the generative classification model;
 outputting a feature data set of the image data;
 providing the feature data set to a discriminative classification model;
 performing discriminative classification operations on the provided feature data set; and
 generating a classification of the image;
wherein the feature data set is a feature vector defined as:

$$\phi_{c,i,j}(I_g) = -\frac{I_g(i,j) - \vartheta_c(i,j)}{\vartheta_c(i,j)(1 - \vartheta_c(i,j))} \quad (3)$$

where $I_g(i,j)$ is the pixel value at location (i,j) of the observed character image, and $\theta_c(i,j)$ is an estimated value derived from the character template of character c at Location (i, j).

* * * * *